Sept. 19, 1967  KIOSHI ITO ET AL  3,343,043
AUTOMATIC EXPOSURE TIME CONTROL ARRANGEMENT
Filed Oct. 30, 1964
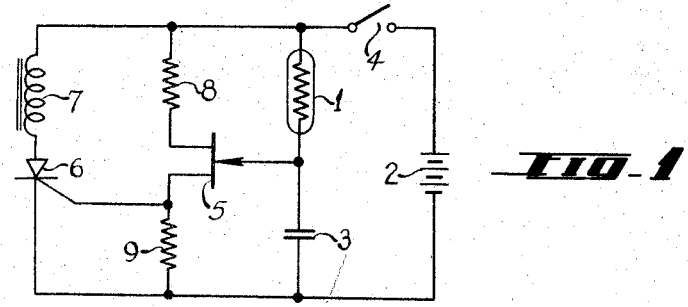
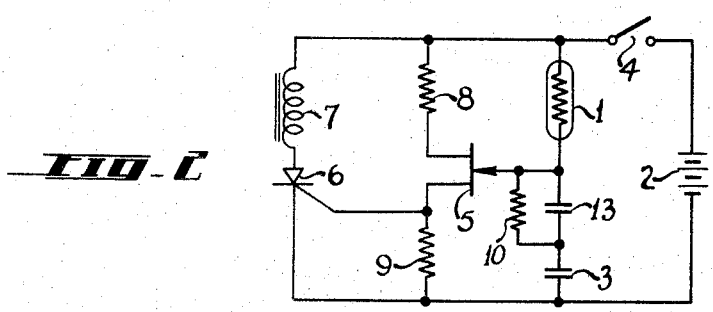
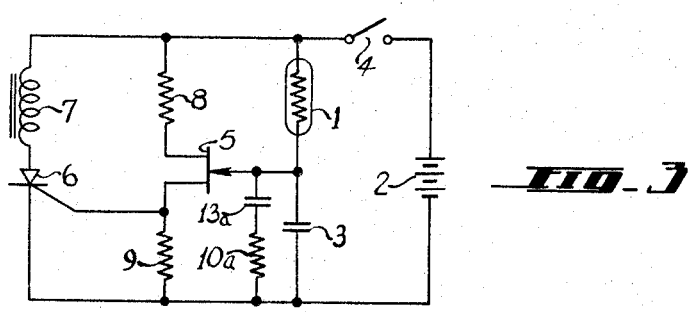
INVENTOR.
KIYOSHI ITO
NAOYUKI UNO
BY Stanley Wolder United States Patent Office 3,343,043
Patented Sept. 19, 1967

3,343,043
AUTOMATIC EXPOSURE TIME CONTROL
ARRANGEMENT
Kioshi Ito, Tokyo-to, and Naoyuki Uno, Urawa-shi,
Japan, assignors to Asahi Kogaku Kogyo Kabushiki
Kaisha
Filed Oct. 30, 1964, Ser. No. 407,836
Claims priority, application Japan, Nov. 6, 1963,
38/83,874
7 Claims. (Cl. 317—124)

ABSTRACT OF THE DISCLOSURE

A camera shutter automatic timer includes an R-C timer network comprising a photoconductor and a timing capacitor connected in series to a voltage source. A sensitivity compensating network includes a resistor and a second capacitor is also connected through the photoconductor to the voltage source either in series with each other across the timing capacitor or in parallel with each other and in series with the timing capacitor. A shutter control solenoid is connected to the output of an amplifier which responds to the voltage across the timing capacitor.

---

The present invention relates generally to improvements in electrical control networks and it relates particularly to an improved light responsive exposure control system for photographic cameras and the like.

There are many exposure mechanisms and devices employed in cameras which automatically regulate the diaphragm opening, the exposure time, or both in accordance with and in response to the incident light. Among these devices is a type employing a capacitor charged from a voltage source through a photoconductor exposed to the camera incident light and means responsive to the capacitor charge for effecting the termination of the exposure or the closing of the camera shutter. While the aforesaid type of exposure control possesses numerous advantages over the other types it has an important drawback which seriously limits its application. The overall sensitivity thereof varies with the intensity of the incident light thereby to impair its accuracy which varies with the light conditions.

It is therefore a principal object of the present invention to provide an improved electrical control timing network.

Another object of the present invention is to provide an improved light responsive automatic exposure control system for photographic cameras and the like.

Still another object of the present invention is to provide an improved light responsive camera exposure control system of the type which employs an integrating network including a capacitor connected to a voltage source through a photoconductor element.

A further object of the present invention is to provide an automatic exposure control network of the above nature characterized by its accuracy over a wide range of light conditions, its reliability, simplicity and adaptability.

The above and another objects of the present invention will become apparent from a reading of the following description taken in conjunction with the accompanying drawing, wherein:

FIGURE 1 is a circuit diagram of a capacitor charging exposure control network of generally known types;

FIGURE 2 is a circuit diagram of an exposure control network embodying the present invention; and FIGURE 3 is a circuit diagram of another embodiment of the present invention.

In a sense the present invention contemplates the provision of an automatic exposure control mechanism comprising a voltage source, a photoconductor, a first capacitor, means connecting said first capacitor through said photoconductor across said voltage source, a control member responsive to the charge on said first capacitor, and a compensating network including a resistor and a second capacitor connected through said photoconductor to said voltage source.

According to a preferred form of the present mechanism the means for connecting the first capacitor to the voltage source includes a switch and the compensating network is connected in series with the first capacitor and the resistor and second capacitor are connected in parallel. The control member comprises a solenoid connected to the output of a solid state amplifier switch the input to which is across the capacitor and the compensating network. In accordance with a modified form of the present mechanism the compensating network is connected across the first capacitor and the resistor and second capacitor are connected in series.

An automatic exposure time control system for a camera shutter is known in which a charge timing control circuit is constituted by a photosensitive output arrangement varying its output in accordance with object brightness and is coupled to a capacitor, and a predetermined charge voltage on said capacitor causes the closing of the shutter. An example of such a system is illustrated in FIG. 1 of the drawing in which a photoconductor 1, such as a cadmium sulfide cell is mounted to a part of the camera so as to receive the light rays from the object to be photographed. A battery 2 is a power or voltage source for the photoconductor 1 and is connected in series therewith to constitute a photosensitive output network, which network is in turn connected to a capacitor 3 to define a charge timing control circuit including the photoconductor 1 as a resistor. A switch 4 which is connected in series in said timing circuit is concurrently closed in any suitable manner, with the shutter opening operation, to connect the timing circuit to the voltage source and effect the charging of the capacitor 3 at a rate depending on the resistance value of the photoconductor which varies in accordance with the light incident thereon.

When a predetermined charge terminal voltage of the capacitor 3 is applied as a control on a trigger signal to the input of an amplifier switch the resulting output voltage is applied to a shutter closing actuating solenoid 7 the resulting closing actuation resulting at a predetermined time in accordance with the incident light.

As seen in FIGURE 1 of the drawing, the amplifier switch is of the solid state type and includes a double base diode input stage 5, the bases of which are connected through respective resistors 8 and 9 of a voltage dividing network through the switch 4 across the battery 2. The control electrode of the double base diode 5 is connected to the upper output terminal of the capacitor 3. A shutter closing actuating solenoid 7 is connected in series with the output terminals of a solid state switch, such as a silicon controlled diode 6, and through the switch 4 across the battery 2. The control electrode of the silicon controlled diode 6 is connected to the output of the double base diode 5 as taken from the upper end of the resistor 9.

In the automatic exposure time control system described above, the resistance of the photoconductor 1 varies in accordance with the intensity of the light incident thereon which it receives from the object to be photographed. When the switch 4 is closed simultaneously with, or in a movement coupled to the shutter opening operation, the charge voltage of the capacitor 3 gradually rises in accordance with the resistance value of the photoconductor 1 at that time, and such voltage is applied as a signal to the control element 5. Although the switch 4 is closed, due to the normally open condition of the fixed voltage actuation or switch element 6, the current does not flow through the operating circuit including the solenoid 7 and the solenoid remains inoperative. When the terminal voltage of the capacitor 3 reaches a predetermined triggering value, this voltage triggers the diode element 5 which in turn applies a triggering voltage to the diode 6 to sharply render it conductive and to thus close the energizing circuit to the solenoid 7, and the solenoid 7 is thereby actuated. Accordingly the time interval from the closure of the switch 4 due to the shutter opening to the shutter closing operation is related to the concurrent resistance value of the photoconductor 1, and therefore an automatic exposure time control in accordance with the object brightness is effected.

However, the automatic control arrangement based on the above explained system, when embodied with the basic circuit arrangement as shown if FIG. 1, generally does not operate accurately for the following reason:

The open shutter duration, the time interval from closure of the switch 4 to the actuation of the solenoid 7, that is, the time required by the capacitor 3 to reach the predetermined triggering voltage is represented by the equation:

$$t = AR_pC$$

where A is a constant determined by the power source voltage and the voltage between the control element 5 and ground; $R_p$ is the resistance value of the photoconductor 1; and C is the capacitance of the capacitor 3.

Accordingly, so far as the capacitor 3 is of fixed capacitance, the open shutter duration is inversely proportional to the resistance value of the photoconductor 1.

On the other hand, it is well known that in connection with film sensitization the following relationship is required: $t = KL^{-1}$ where L is the brightness of the object to be photographed; and K is a constant for obtaining proper exposure.

From the above two equations, it follows that $$R_p = (K/AC) \times 1/L$$

For obtaining proper exposure, the relationship between the resistance R of the photoconductor and the object brightness should satisfy the above equation. Therefore, in so far as the resistance value of the photoconductor 1 is accurately inversely proportional to the object brightness, the above described basic system can operate with sufficiently high accuracy. However, generally the relationship between the resistance value of the photoconductor 1 and the illumination is given by the following equation $$R_p = K'L^{-n} (0 < n \leq 1) \ (K': \text{constant})$$

Only in the event $n=1$ is the basic circuit operation accurate. However, the photoconductor 1 commonly does not possess characteristic of $n=1$. As a consequence, a doubling of the brightness is not accompanied by the reduction-by-half of the resistance value of the photoconductor and accordingly in the high illumination range the open shutter duration is greater than the proper value thereof, and further, if adjustment is made on the basis of the high illumination range, the exposure time is less than the proper value.

The circuit network of the present invention eliminates the above disadvantage by providing exposures of substantially the proper value in both the high and low illumination range. In the improved arrangement, a compensating circuit having an additional or second capacitor 13 and a compensating resistor 10 connected together is arranged in the timing control circuit which includes the photoconductor 1 and the capacitor 3 in series connection and the time needed for reaching the triggering voltage at the control element 5 is controlled by the relative ratio of the resistance value of the light receiving photoconductor 1 and the compensating resistor 10. In accordance with a preferred embodiment of the present invention, as shown in FIG. 2 of the drawing, the compensating circuit comprises an additional second capacitor 13 connected in series between the first capacitor 3 and the photoconductor 1 and a compensating resistor 10 is connected across the second capacitor 13. In all other respects the network is similar to that illustrated in FIG. 1 and described above. The characteristic of the improved circuit are set forth below, assuming that the capacitances of the capacitors 3 and 13 to be $C_1$ and $C_2$ respectively.

When the object brightness is very high, the resistance value of the photoconductor 1 is very low, and relative to this resistance value the resistor 10 presents a very high resistance value. As a result the circuit containing the resistor 10 presents a condition equivalent to that of an open or insulated circuit. Consequently the resultant capacitance of the capacitors 3 and 13 is $C_1C_2/(C_1+C_2)$ which is smaller than $C_1$ or $C_2$, the capacitance of either of the two capacitors. Accordingly, the time for reaching the predetermined or triggering voltage which is applied to the control element 5 for actuating the fixed voltage actuation element 6 is shortened and early actuation of the solenoid 7 can be expected. As a result, the said general tendency of over exposure in high illumination range is avoided.

On the other hand, in the very low illumination range, the resistance value of the photoconductor 1 becomes very great when compared with that of the resistor 10. Considering the relative ratio of these two values, the circuit having the resistance 10 is regarded as equivalent to or approximately constituting a short circuit. As a result, the controlled timing amount for actuation of the relay 7 relates only to the capacitance $C_1$ of the capacitor 3. Accordingly, if the capacitance of the capacitor 3 is determined to be larger than that of the case as shown in FIG. 1 the time interval for reaching the predetermined triggering voltage is lengthened and underexposure is avoided.

On the basis of the above mentioned general characteristic, first the capacitance of the capacitor 3 is so determined that at the largest obtained resistance value of the photoconductor 1 the correspondingly desired time constant results, and then the capacitance of the capacitor 13 is so determined relative to the capacitance of the capacitor 3, that at the smallest obtained resistance value of the photoconductor 1 the correspondingly desired time constant results, and then in this range of high and low obtained resistance value range of the photoconductor 1, proper resistance value for practical use is selected. By taking such measure, overexposure in high illumination range and underexposure in low illumination range are avoided and highly accurate automatic control of the shutter operation can be carried out over the full illumination range. The values of the resistor 10 and the capacitor 13 with respect to the other parameters may be easily determined or computed by one skilled in the art.

In the embodiment of the present invention shown in FIG. 3, the compensating circuit includes a series connected compensating resistor 10a and an additional or second capacitor 13a connected across or parallel to the capacitor 3. In all other respects the network is similar to that illustrated in FIG. 1 and described above. When in the very high illumination range the resistance value of the resistor 10a is very great as compared with that of the photoconductor 1, the charging circuit of the capacitor 13a is relatively substantially open or insulated and accordingly the time constant is controlled primarily relative to the capacitance of the capacitor 3 only. In view of this condition, by selecting small capacitance value $C_{1a}$ of the capacitor 3, the time needed for reaching the predetermined voltage is shortened and overexposure in the high illumination range is avoided.

On the other hand, when the resistance value of the photoconductor 1 becomes very large relative to that of the resistor 10a that is in a very low illumination range, the effect of the resistor 10a as a charging circuit resistance becomes very small. Accordingly, approximately the resultant capacitance of the two capacitors, namely $C_{1a}+C_{2a}$, becomes the controlling function of the charging time constant and lengthens the time interval for the control voltage on the diode 5 to reach the predetermined triggering value. As a result, the actuating time of the solenoid 7 is deferred and underexposure is avoided.

Thus, a similar compensational operation as that of the arrangement as shown in FIG. 2 can be effected out by arranging the circuit as follows: First the capacitance $C_{1a}$ of the capacitor 3 is so selected that the desired time constant can be obtained at the smallest desired obtained resistance value of the photoconductor 1, then the capacitance $C_{2a}$ of the capacitor 13a is so determined relative to the capacitance $C_{1a}$ of the capacitor 3 that the desired time constant can be obtained at the largest desired obtained resistance value of the photoconductor 1, and finally an appropriate value within the range of used resistance value of said photoconductor 1 is selected for the resistor 10.

As explained above, according to the automatic control arrangement of the present invention, the defects which conventional arrangements possess have been eliminated so that automatic exposure time control within both the high and low illumination ranges can be carried out with a high degree of accuracy and accordingly a great practical advantage is obtained.

While there has been described and illustrated preferred embodiments of the present invention it is apparent that numerous alterations, omissions and additions may be made without departing from the spirit thereof.

What is claimed is:

1. An automatic exposure control mechanism comprising a voltage source, a photoconductor, a first capacitor, means connecting said first capacitor through said photo conductor across said voltage source, a control member responsive to the charge on said first capacitor, and a compensating network including a resistor and a second capacitor and means connecting said resistor and said second capacitor in series with said photoconductor to said voltage source.

2. An automatic exposure control mechanism comprising a voltage source, a photoconductor, a first capacitor, a second capacitor, means connecting said first and second capacitors in series through said photoconductor across said voltage source, a control member responsive to the charge on said first capacitor, and a resistor connected across said second capacitor.

3. An automatic exposure control mechanism comprising a voltage source, a photoconductor, a first capacitor, means connecting said first capacitor through said photoconductor across said voltage source, a control member responsive to the charge on said first capacitor, a resistor, and a second capacitor connected in series with said resistor across said first capacitor.

4. An automatic exposure control mechanism comprising a voltage source, a photoconductor, a first capacitor, a second capacitor, means connecting said first and second capacitors in series through said photoconductor across said voltage source, a resistor connected across said second capacitor, a control solenoid, and a solid state amplifier having an input connected across said first capacitor and an output connected through said solenoid.

5. An automatic exposure control mechanism comprising a voltage source, a photoconductor, a first capacitor, means connecting said first capacitor through said photoconductor across said voltage source, a resistor, a second capacitor connected in series with said resistor across said first capacitor, a control solenoid, and a solid state amplifier having an input connected across said first capacitor and an output connected through said solenoid.

6. An automatic exposure control mechanism comprising a voltage source, a photoconductor, a first capacitor, means connecting said first capacitor through said photoconductor across said voltage source, a compensating network including a resistor and a second capacitor and means connecting said resistor and said second capacitor in series with said photoconductor to said voltage source, a control solenoid, and a solid state amplifier having an input connected across said first capacitor and an output connected through said solenoid.

7. An automatic exposure control mechanism comprising a voltage source, a photoconductor, a first capacitor, means connecting said first capacitor in a charging circuit through said photoconductor across said voltage source, a compensating network including a resistor and a second capacitor connected in the said charging circuit, and a control member responsive to the charge on at least one of said capacitors.

References Cited

UNITED STATES PATENTS

| 3,099,758 | 7/1963 | Pieczynski | 307—141.8 |
| 3,142,004 | 7/1964 | Culbertson | 317—142 |
| 3,162,772 | 12/1964 | Smith | 307—88.5 |
| 3,257,919 | 6/1966 | Takayoski Sato et al. | 317—124 X |
| 3,258,579 | 6/1966 | Dills | 219—398 |

MILTON O. HIRSHFIELD, *Primary Examiner.*

J. A. SILVERMAN, *Assistant Examiner.*